(12) United States Patent
Marupaduga et al.

(10) Patent No.: US 10,285,176 B1
(45) Date of Patent: May 7, 2019

(54) WIRELESS ACCESS POINT OPTIMIZATION OF CARRIER AGGREGATION USING BEAMFORMING

(71) Applicant: Sprint Communications Company L.P., Overland Park, KS (US)

(72) Inventors: Sreekar Marupaduga, Overland Park, KS (US); Andrew Mark Wurtenberger, Olathe, KS (US)

(73) Assignee: Sprint Communications Company L.P., Overland Park, KS (US)

(*) Notice: Subject to any disclaimer, the term of this patent is extended or adjusted under 35 U.S.C. 154(b) by 41 days.

(21) Appl. No.: 15/581,238

(22) Filed: Apr. 28, 2017

(51) Int. Cl.
| | | |
|---|---|---|
| *H04W 72/04* | (2009.01) | |
| *H04L 5/00* | (2006.01) | |
| *H04W 16/28* | (2009.01) | |
| *H04W 84/04* | (2009.01) | |

(52) U.S. Cl.
CPC ......... *H04W 72/0453* (2013.01); *H04L 5/001* (2013.01); *H04W 16/28* (2013.01); *H04W 72/042* (2013.01); *H04W 84/042* (2013.01)

(58) Field of Classification Search
CPC ............. H04W 72/0453; H04W 16/28; H04W 72/042; H04W 84/042; H04W 72/121; H04W 72/1252; H04W 88/08; H04L 5/001
See application file for complete search history.

(56) References Cited

U.S. PATENT DOCUMENTS

| | | | |
|---|---|---|---|
| 9,503,915 B2 | 11/2016 | Dharanipragada et al. | |
| 2009/0322613 A1 | 12/2009 | Bala et al. | |
| 2011/0274043 A1 | 11/2011 | Nam et al. | |
| 2012/0063302 A1* | 3/2012 | Damnjanovic | ... H04W 74/0833 370/228 |
| 2012/0113944 A1 | 5/2012 | Yang et al. | |
| 2013/0088973 A1 | 4/2013 | Yang et al. | |
| 2013/0301525 A1* | 11/2013 | Xu | ......... H04W 48/12 370/328 |
| 2015/0172987 A1 | 6/2015 | Balakrishnan et al. | |

FOREIGN PATENT DOCUMENTS

KR 20110093632 A 8/2011

\* cited by examiner

*Primary Examiner* — Dady Chery

(57) ABSTRACT

A wireless access point to optimize carrier aggregation using beamforming. The wireless access point wirelessly exchanges communication data with User Equipment (UE) over a plurality of frequency bands. The wireless access point identifies a UE using carrier aggregation and identifying a frequency band of the plurality of frequency bands having beamforming capabilities. The wireless access point then allocates the UE using carrier aggregation a Primary Component Carrier (PCC) on the frequency band having beamforming capabilities. In response to the PCC allocation, the wireless access point transfers an indication to the UE indicating the PCC allocation on the frequency band having beamforming capabilities and wirelessly exchanges additional communication data with the UE using carrier aggregation over the frequency band using beamforming.

14 Claims, 7 Drawing Sheets

WIRELESS ACCESS POINT OPTIMIZATION OF CARRIER AGGREGATION USING BEAMFORMING

TECHNICAL BACKGROUND

Wireless communication systems exchange user data between communication devices to facilitate various data services, like internet access, voice calling, media streaming, data messaging, and the like. Wireless communication systems allow users to move about as they communicate.

A wireless communication system may employ carrier aggregation. Carrier aggregation allows communication networks to use multiple resource blocks simultaneously for a UE. A UE uses carrier aggregation to increase data throughput and transmission speeds to a wireless access point. Wireless communication systems can aggregate carriers over various frequency bands using intra-band contiguous carrier aggregation, intra-band non-contiguous carrier aggregation, and inter-band non-contiguous carrier aggregation.

Intra-band contiguous carrier aggregation uses component carriers that are in the same frequency band and are adjacent to each other. Intra-band non-contiguous carrier aggregation uses component carriers that are in the same frequency band but are not adjacent to each other. Inter-band carrier aggregation uses component carriers that are in different frequency bands. Carrier aggregation configurations for UEs communicating may include a Primary Component Carrier (PCC) to exchange control and signaling data and one or more Secondary Component Carriers (SCCs) to exchange additional user data between the UE and the wireless access point.

Some wireless communication networks and devices may use Orthogonal Frequency Division Multiplexing (OFDM) to exchange wireless data. In wireless communication systems, multiple transmission modes may be used to provide wireless signaling to the various wireless communication devices. Accordingly, a device that is located in a first location may be serviced with a first transmission mode from a wireless access point but then a second transmission mode when located in a second position.

In some instances, as wireless communication devices move within the geographic region supported by the wireless access point, the base station may provide better communication connectivity using beamformed signals over spatial multiplexed signal, such as when located at a cell edge or in areas or high interference from other wireless access points. Using beamforming, the wireless access point can use feedback data from the wireless communication device to adjust transmit parameters to provide improved robustness of data transmission or increased data rates. In other instances, the base station may provide better communication connectivity using spatial multiplexing to maintain the communication, such as when the wireless communication device is moving quickly or changing speed quickly, in which less feedback data is required. Unfortunately, current techniques of using beamforming for a UE using carrier aggregation are not efficient or effective.

TECHNICAL OVERVIEW

A wireless access point to optimize carrier aggregation using beamforming. The wireless access point wirelessly exchanges communication data with User Equipment (UE) over a plurality of frequency bands. The wireless access point identifies a UE using carrier aggregation and identifying a frequency band of the plurality of frequency bands having beamforming capabilities. The wireless access point then allocates the UE using carrier aggregation a Primary Component Carrier (PCC) on the frequency band having beamforming capabilities. In response to the PCC allocation, the wireless access point transfers an indication to the UE indicating the PCC allocation on the frequency band having beamforming capabilities and wirelessly exchanges additional communication data with the UE using carrier aggregation over the frequency band using beamforming.

DETAILED DESCRIPTION

Figure 1:
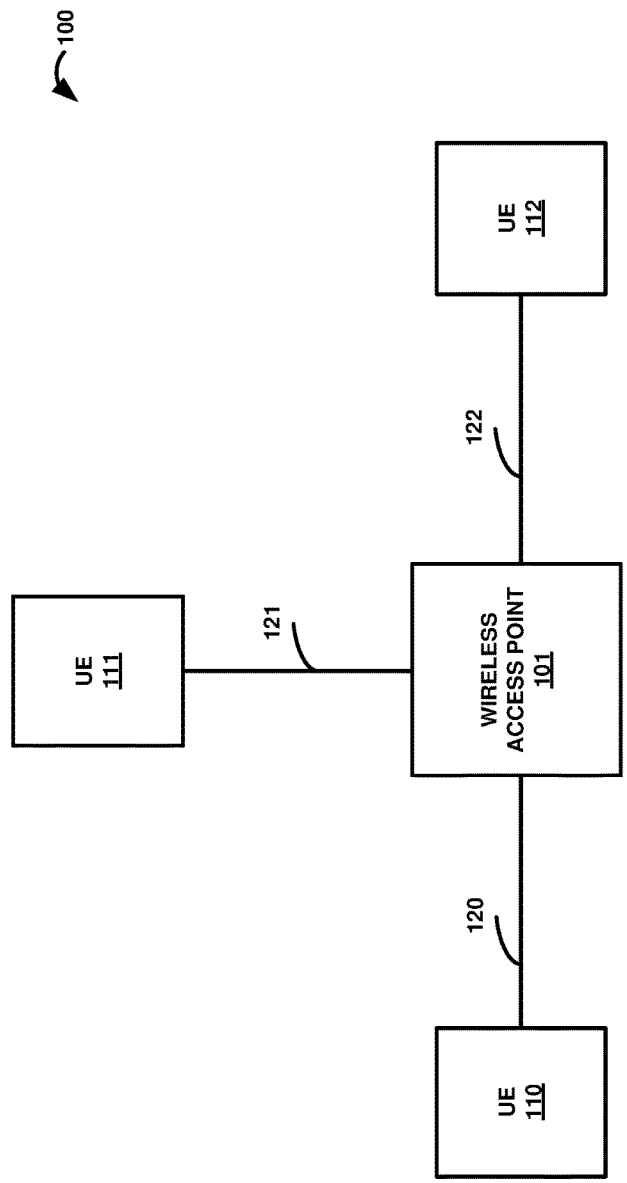
FIGS. 1-3 illustrate a wireless communication system 100 to optimize carrier aggregation using beamforming.
Figure 2:
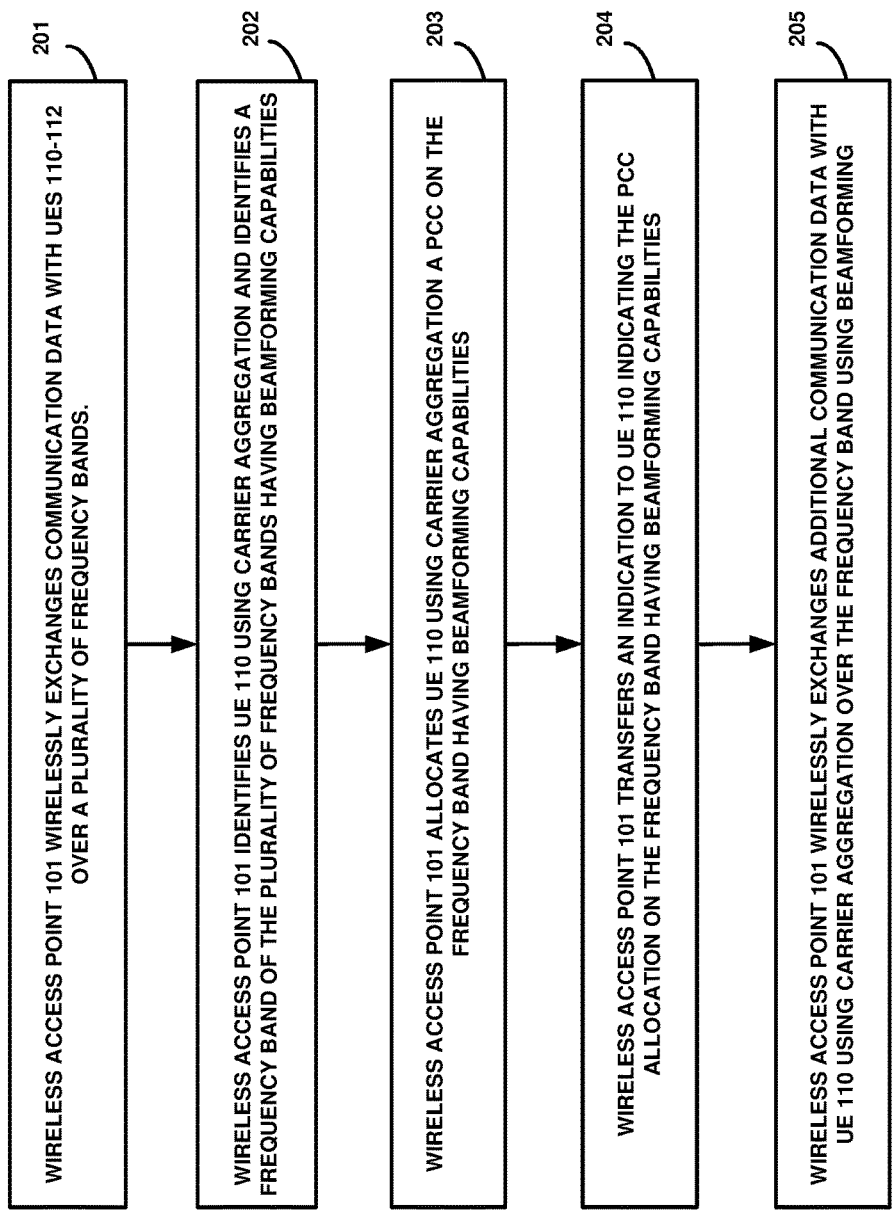
Figure 3:
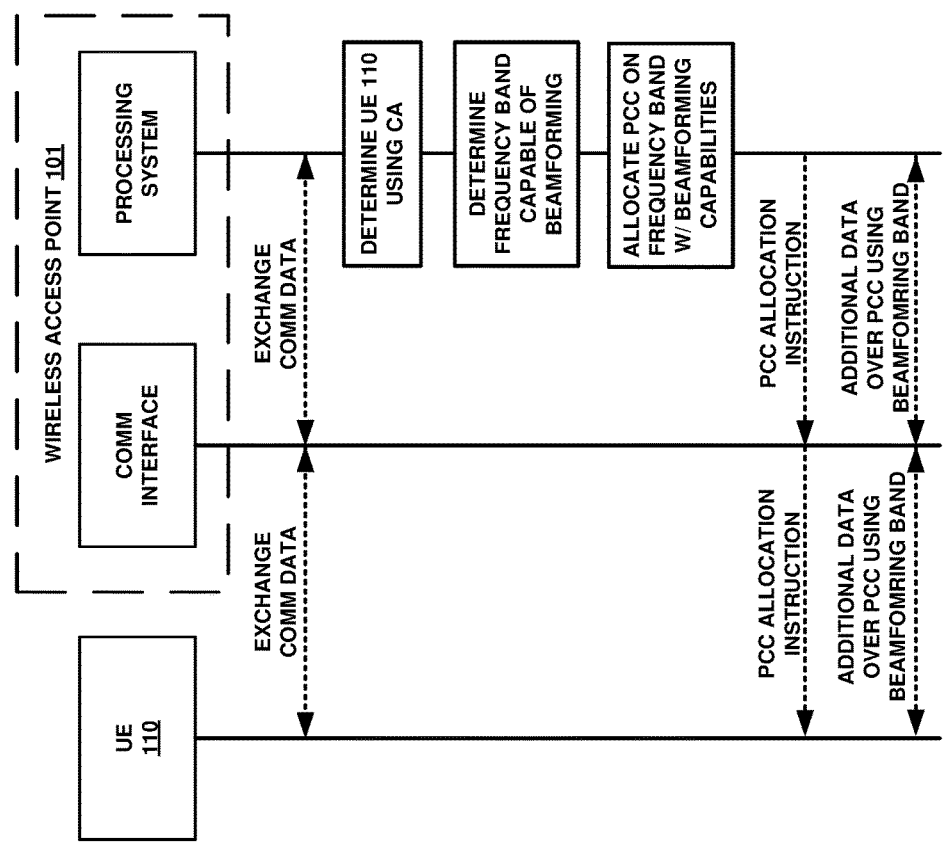

FIGS. 1-3 illustrate wireless communication system 100 to optimize carrier aggregation using beamforming. Referring to FIG. 1, wireless communication system 100 comprises wireless access point 101 and UEs 110-112. Wireless access point 101 communicates with UEs 110-112 over wireless communication links 120-122.

UEs 110-112 could each be a phone, tablet computer, media player, intelligent machine, or some other apparatus having a wireless transceiver. UE 110 includes antennas, modulators, processing circuitry, memory devices, software, and bus interfaces. The processing circuitry comprises transistors, registers, and signal paths. The memory devices comprise flash drives, disc drives, read-only circuitry, or some other data storage media.

Wireless access point 101 may comprise a macro base station, a wireless hotspot, an evolved NodeB (eNodeB), or some other wireless access point that may provide wireless communication services to UEs 110-112. Wireless access point 101 includes RF communication circuitry, communication interfaces, network interfaces, processing systems, microprocessors, storage systems, storage media, or some other processing devices or software systems, and may be distributed among multiple devices.

Wireless access point 101 and UE 110 exchange data over transmit protocols. Wireless access node 101 provides various transmission modes based on the device and requirement for the communication. Here, wireless access point 101 uses at least beamforming, closed-loop spatial multiplexing, and open-loop spatial multiplexing. Wireless communication links 120-122 use air or space as the transport media. Wireless communication links 120-122 may use various protocols, such as Long Term Evolution (LTE), Code Division Multiple Access (CDMA), Orthogonal Frequency Division Multiplexing Access (OFDMA), LTE Wireless Aggregation (LWA), Internet Protocol (IP), or some other wireless communication format—including combinations thereof.

In a first operation, wireless access point 101 wirelessly exchanges communication data with UEs 110-112 over a plurality of frequency bands. Communication data may include attachment and registration information to establish signaling between UEs 110-112 and wireless access point 101. Communication data may also include user data for media services, such as voice calls, media streaming, internet access, and the like.

Wireless access point 101 identifies UE 110 using carrier aggregation and identifies a frequency band of the plurality of frequency bands having beamforming capabilities. Carrier aggregation enables wireless access point 101 to exchange network signaling with UE 110 and other UEs using multiple resource blocks simultaneously. UE 110 uses carrier aggregation to increase data throughput and transmission speeds to wireless access point 101. Each aggregated carrier is referred to as a component carrier which may be allocated for an uplink or downlink for UE 101.

Wireless access point 101 then allocates UE 110 using carrier aggregation a Primary Component Carrier (PCC) on the frequency band having beamforming capabilities. A PCC includes a component carrier scheduled by a primary serving cell which is used to exchange UE control and signaling data. Secondary Component Carriers (SCCs) include additional component carriers used by UE 101 to exchange additional user data and may be added or removed as needed. The number of carrier aggregation component carriers may comprise a number of SCCs.

Beamforming uses multiple transmitting antennas to provide increased power for particular communications. Wireless access point 101 may then provide data communication services to UE 101, like internet access, voice calls, media streaming, user messaging, among other communication services.

In response to the PCC allocation, wireless access point 101 transfers an indication to UE 110 indicating the PCC allocation on the frequency band having beamforming capabilities and wirelessly exchanges additional communication data with UE 110 using carrier aggregation over the frequency band using beamforming.

As a result of the multiple signaling formats, it may be necessary for wireless access point 101 to transition UE 110 from communicating using a first transmit protocol to communicating using an alternative transmit protocol. Wireless access point 101 may initiate a communication with UE 110 using beamforming as a result of the beamforming signals having a higher throughput, UE 110 being located in a particular geographic location relative to wireless access point 101, or some other reason.

FIG. 2 is a flow diagram illustrating an operation of wireless communication system 100 to optimize carrier aggregation using beamforming. Wireless access point 101 wirelessly exchanges (201) communication data with UEs 110-112 over a plurality of frequency bands. Wireless access point 101 identifies (202) UE 110 using carrier aggregation and identifies (202) a frequency band of the plurality of frequency bands having beamforming capabilities.

Wireless access point 101 then allocates (203) UE 110 using carrier aggregation a PCC on the frequency band having beamforming capabilities. In response to the PCC allocation, wireless access point 101 transfers (204) an indication to UE 110 indicating the PCC allocation on the frequency band having beamforming capabilities. In a final operation, wireless access point 101 wirelessly exchanges (205) additional communication data with UE 110 using carrier aggregation over the frequency band using beamforming.

FIG. 3 is a sequence diagram illustrating the operation of communication system 100 to optimize carrier aggregation using beamforming. wireless access point 101 wirelessly exchanges communication data with UEs 110-112 over a plurality of frequency bands. In this example, the data processing system of wireless access point 101 receives an attachment and service request from UE 110 over a wireless communication transceiver.

The data processing system in wireless access point 101 then identifies UE 110 using carrier aggregation and identifies a frequency band of the plurality of frequency bands having beamforming capabilities. Wireless access point 101 may identify UE 110 using carrier aggregation based on UE 110 exchanging signaling and user data over a PCC and additional user data over a number of SCC. For example, UE 110 may be exchanging signaling data over a PCC and streaming video data over two SCCs in a frequency band.

Wireless access point 101 may identify a frequency band of the plurality of frequency bands having beamforming capabilities by determining which frequency bands are capable of directional signal transmission and reception. The beamforming capability information may be stored in a database of wireless access point 101 or be received from a communication network control element, such a Mobility Management Entity (MME). For example, wireless access point 101 may have an internal data structure that relates the frequency band to different beamforming capabilities and coverage area data.

Still referring to FIG. 3, wireless access point 101 then allocates UE 110 using carrier aggregation a PCC on the frequency band having beamforming capabilities. Wireless access point 101 may allocate a PCC on a frequency band having beamforming capabilities by scheduling resource blocks for the PCC in a frequency band that has beamforming capabilities. For example, a 2.4 GHz frequency band may be capable of providing wireless access at a greater distance using beamforming. The PCC for UE 110 would therefore be scheduled resource blocks on the 2.4 GHz frequency band.

In response to the PCC allocation, wireless access point 101 transfers an indication to UE 110 indicating the PCC allocation on the frequency band having beamforming capabilities. Wireless access point 101 may wirelessly transfer the instruction to UE 110 in a Radio Resource Control (RRC) message.

In a final operation, wireless access point 101 then wirelessly exchanges additional communication data with UE 110 using carrier aggregation over the frequency band using beamforming. Wireless access point 101 may then provide data communication services to UE 110, like internet access, voice calls, media streaming, user messaging, among other communication services.

In some examples, wireless access point 101 identifies UE 110 using inter-band carrier aggregation. Inter-band carrier aggregation uses component carriers that are in different frequency bands. For example, wireless access point 101 may identify that UE 110 is using a PCC in a first frequency band and SCCs in other frequency bands. The PCC for UE 110 may then be allocated a frequency band that has beamforming capabilities and the SCCs may be allocated a frequency band that may or may not have beamforming capabilities.

In some examples, the beamforming capabilities comprise LTE Transmission Mode 9 (TM9) capabilities. TM9 uses up to eight layers and therefore, up to eight physical transmit antennas are needed. The number of layers used may be dynamic. TM9 is designed to help reduce interference between base stations to maximize signal stability and boost performance. TM9 has advantages of high spectrum efficiency using higher order Multiple Input and Multiple Output (MIMO) and cell-edge data rates.

In other examples, the beamforming capabilities comprise LTE Transmission Mode 8 (TM8). TM8 uses dual-layer beamforming which permits wireless access point 101 to weigh two layers individually at the antennas so that beamforming can be combined with spatial multiplexing for one or more UEs. Reference signals specific to UE 110 are used.

In some examples, wireless access point 101 also identifies the mobility rate for the UE using carrier aggregation and allocating the UE using carrier aggregation the PCC on the frequency band having beamforming capabilities when the mobility rate for the UE using carrier aggregation is high. Wireless access point 101 may determine a mobility rate for UE 110 based on a reported velocity of UE 110, a UE handover rate, a change in reported signal strengths from UE 110, or any other technique for determining a velocity of UE 110.

For example, UE 110 may have a high wireless access point handover rate indicating that UE 110 has a high mobility rate. Wireless access point 101 may then allocate UE 110 using carrier aggregation a PCC on the frequency band having beamforming capabilities. Advantageously, this allows UE 110 to have a wireless access for the PCC at a greater distance than if UE 110 were on a frequency band without beamforming capabilities.

In other examples, wireless access point 101 additionally identifies UE 110 using intra-band carrier aggregation. Intra-band contiguous may include intra-band contiguous carrier aggregation and intra-band non-contiguous aggregation. Intra-band contiguous carrier aggregation uses component carriers that are in the same frequency band and are adjacent to each other. Intra-band non-contiguous carrier aggregation uses component carriers that are in the same frequency band but are not adjacent to each other.

In this example, wireless access point 101 would then identify a frequency channel in a plurality of frequency channels having beamforming capabilities. In this example, wireless access point 101 allocates UE 110 using intra-band carrier aggregation the PCC on the frequency channel having beamforming capabilities in the frequency band. Wireless access point 101 may then exchange additional communication data with UE 110 using carrier aggregation over the frequency channel using beamforming.

In some examples, wireless access point 101 identifies a frequency band of the plurality of frequency bands having non-beamforming capabilities. Wireless access point 101 would then allocate UE 110 using carrier aggregation a SCC on the frequency band having non-beamforming capabilities. In this example, wireless access point 101 then transfers an indication to UE 110 indicating the SCC allocation on the frequency band having non-beamforming capabilities and exchanges additional communication data with UE 110 using carrier aggregation over the frequency band without using beamforming.

In some examples, the non-beamforming capabilities comprise LTE Transmission Mode 4 (TM4) capabilities. TM4 supports spatial multiplexing with up to four layers that are multiplexed to up to four antennas in order to achieve higher data rates. The feedback data for the channel can be estimated by wireless access point 101 transmitting reference signals distributed over various resource elements and over various timeslots. In other examples, the non-beamforming capabilities comprise LTE Transmission Mode 3 (TM3) capabilities. TM3 supports spatial multiplexing of two to four layers that are multiplexed to two to four antennas in order to achieve higher data rates.

Figure 4:
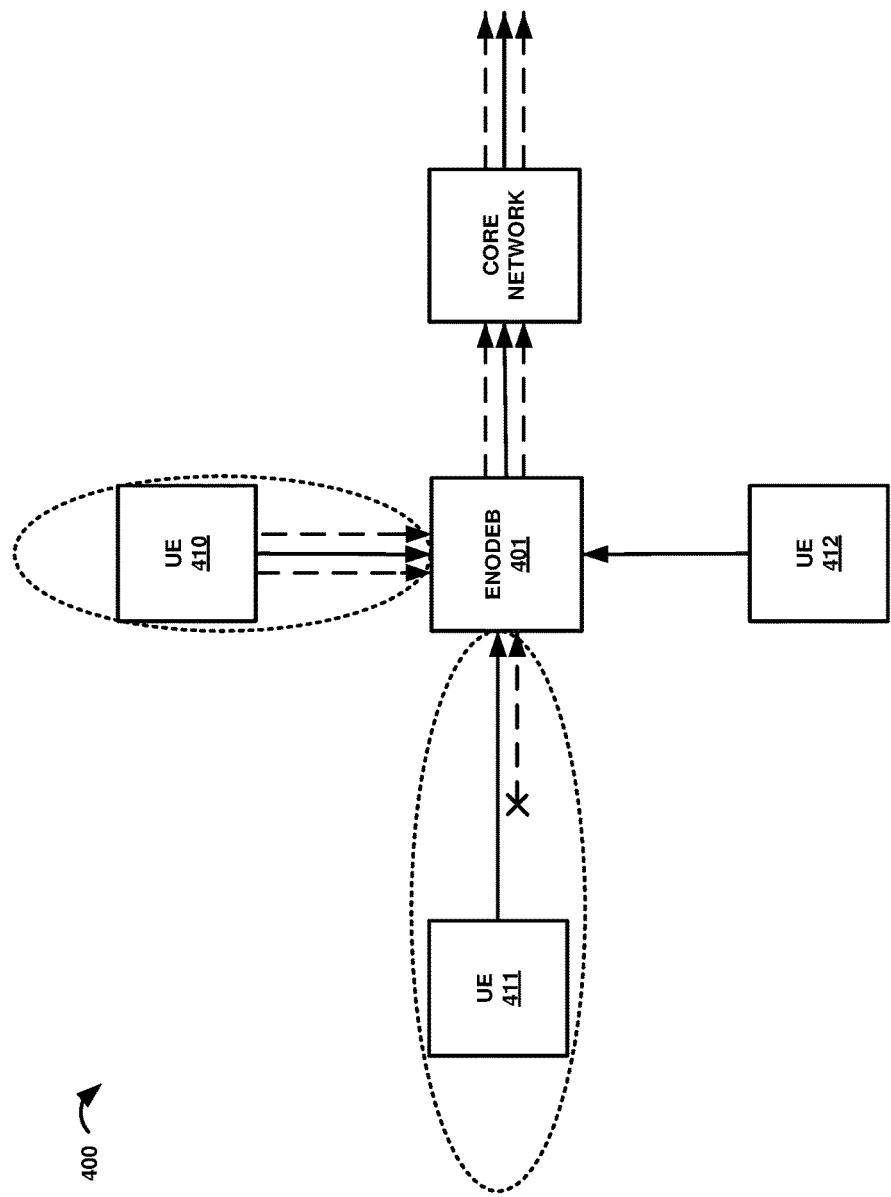
FIGS. 4-5 illustrate a Long Term Evolution (LTE) communication system 400 to optimize carrier aggregation using beamforming.
Figure 5:
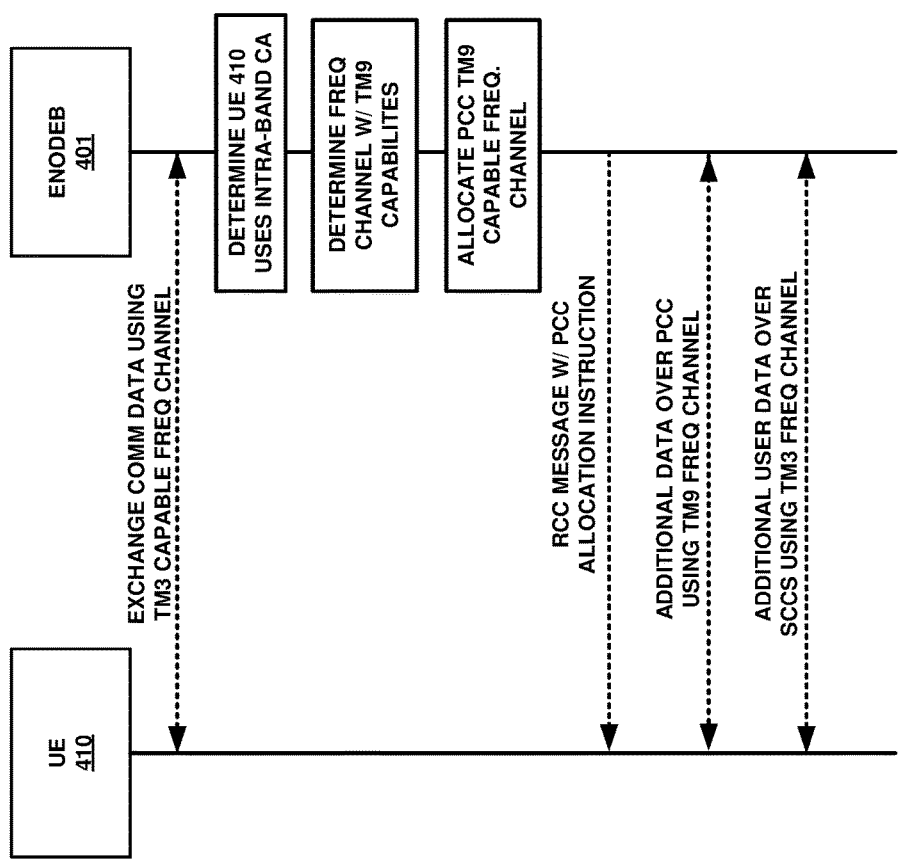

FIGS. 4-5 illustrate LTE communication system 400 to optimize carrier aggregation using beamforming. Referring to FIG. 4, LTE communication system 400 comprises eNodeB 401, UEs 410-412, and a core network. LTE communication system 400 is an example of wireless communication system 100, although these systems may use alternative configurations and operations.

eNodeB 401 exchanges signaling and data with UEs 410-412 over PCCs as indicated by the solid-line arrows. eNodeB 401 also exchanges additional user data with UEs 410-411 over SCCs as indicated by the dashed-line arrows. It should also be noted that UE 411 has moved away from eNodeB 401 far enough to lose its ability to use the SCC for additional user data. However, because UE 411 has been allocated a PCC on a frequency band using beamforming, the PCC has remained connected to eNodeB 401 for signaling and user data.

eNodeB 401 and UEs 410-412 communicate using various transmit protocols, such as using beamforming (as indicated by the dotted-line ellipses) or spatial multiplexing (not shown). In this example embodiment, beamforming may include multi-layer beamforming (TM9) or dual-layer beamforming (TM8). Also in this embodiment, spatial multiplexing may include closed-loop spatial multiplexing (TM4) or open-loop spatial multiplexing (TM3).

Referring to FIG. 5, eNodeB 401 wirelessly exchanges communication data with UEs 410-412 over a plurality of frequency bands including a plurality of frequency channels. eNodeB 401 identifies UE 410 using intra-band carrier aggregation and identifies a frequency channel of the plurality of frequency channels having multi-layer beamforming (TM9) capabilities. eNodeB 401 then allocates UE 410 using intra-band carrier aggregation a PCC on the frequency channel having multi-layer beamforming (TM9) capabilities. In response to the PCC allocation, eNodeB 401 transfers an RCC message to UE 410 indicating the PCC allocation on the frequency channel having multi-layer beamforming (TM9) capabilities. In a final operation, eNodeB 401 wirelessly exchanges additional signaling and user data with UE 410 using intra-band carrier aggregation over PCC on the frequency channel using multi-layer beamforming (TM9) and exchanges additional user data with UE 410 over SCCs on the frequency channel using open-loop spatial multiplexing (TM3).

Figure 6:
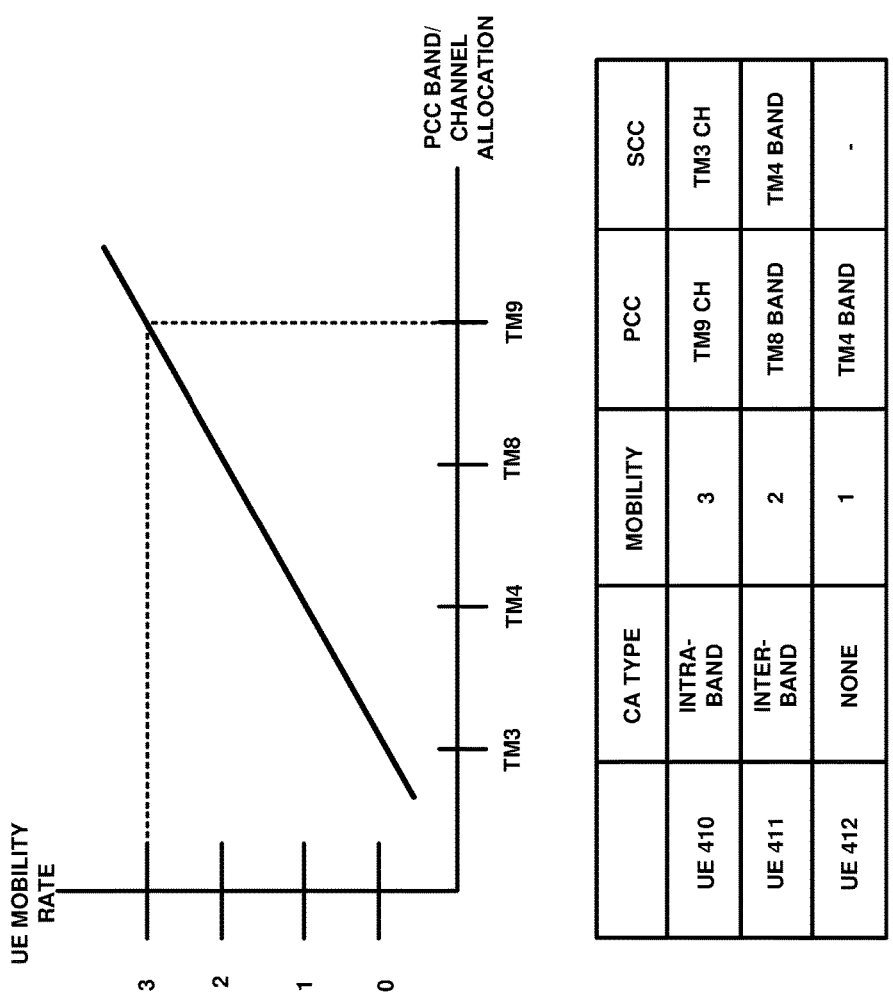
FIG. 6 illustrates a graph and table to optimize carrier aggregation using beamforming.

FIG. 6 illustrates a table and graph to optimize carrier aggregation using beamforming. Referring to the graph, as the mobility of the UE increases, the PCC allocation moves from the open-loop spatial multiplexing (TM3) frequency band/channel to the multi-layer beamforming (TM9) frequency band/channel. Advantageously, as a UE becomes more mobile or moves a greater distance from eNodeB 410, it is allocated a beamforming frequency band or channel for the PCC and can therefore maintain PCC connectivity for signaling and data. However, the SCC for highly mobile and distant UEs will not be allocated beamforming capabilities.

Referring to the table, UE PCC and SCC allocation is dependent on the carrier aggregation type and mobility rate. For example, UE 410 is using intra-band carrier aggregation and has a high mobility rate. Therefore, UE 410 is allocated a PCC channel on a multi-layer beamforming (TM9) capable frequency channel but allocated an SCC on an open-loop spatial multiplexing (TM3) capable frequency channel. On the other hand, UE 411 is inter-band carrier aggregation and has a medium mobility rate. Therefore, UE 411 is allocated a PCC channel on a dual-layer beamforming (TM8) capable frequency band but allocated an SCC on a closed-loop spatial multiplexing (TM4) capable frequency band.

Figure 7:
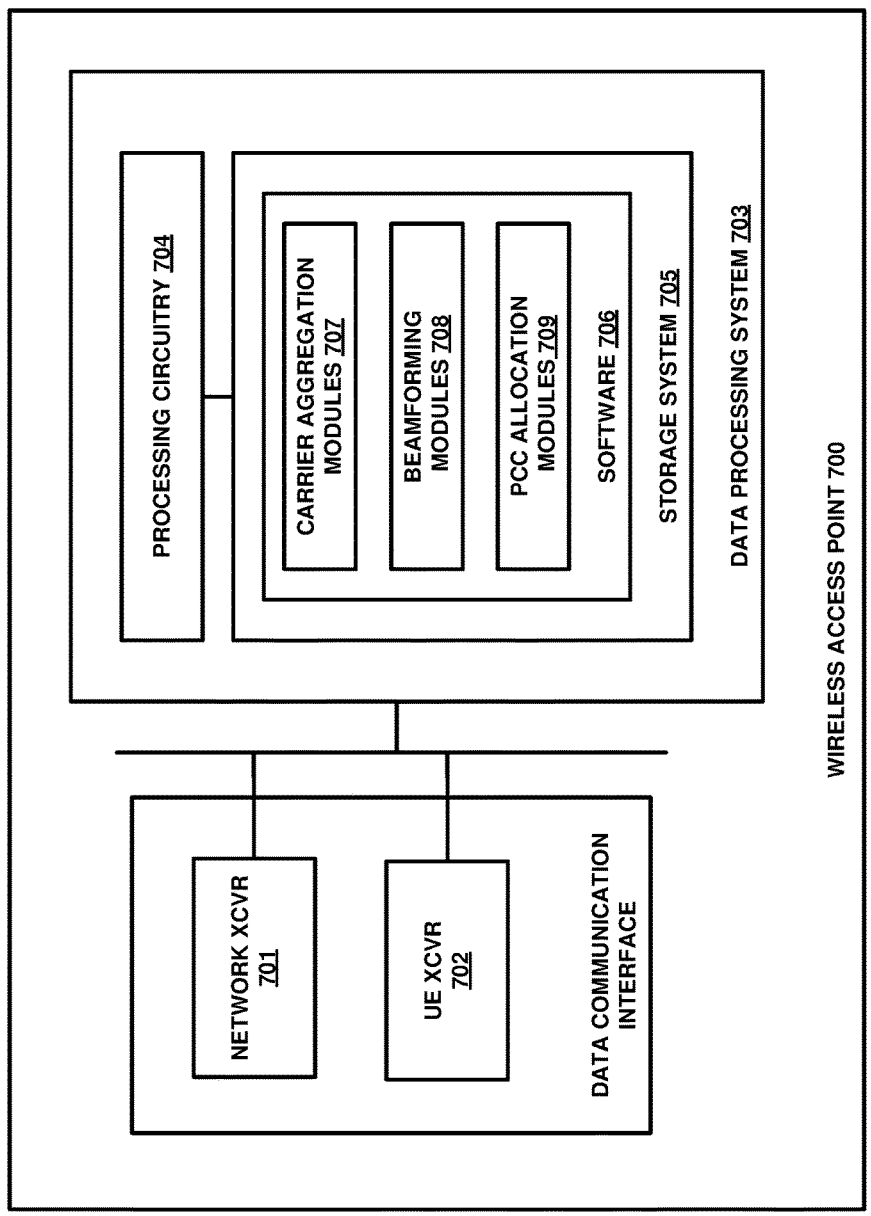
FIG. 7 illustrates a wireless access point to optimize carrier aggregation using beamforming.

FIG. 7 illustrates wireless access point 700 to optimize carrier aggregation using beamforming. wireless access point 700 comprises network transceiver 701, network transceiver 702, and data processing system 703. Wireless access point 700 is an example of wireless access point 101 and LTE eNodeB 401, although these systems may use alternative configurations and operations. Some conventional aspects of wireless access point 700 are omitted for clarity, such as power supplies, enclosures, and the like. wireless access point 700 may be centralized in a single unit or distributed across multiple components.

Network transceiver 701 and UE transceiver 702 comprise antennas, amplifiers, filters, circuitry, digital signal processors, memory devices, wireless protocol software, bus interfaces, and the like. Network transceiver 701 may be configured to use TDM, IP, Ethernet, WDM, SONET, communication signaling, wireless communications, or some other communication format—including improvements thereof. UE transceiver 702 may be configured to use LTE, CDMA, OFDMA, LWA, IP, WiFi, or some other wireless communication format—including combinations thereof. Network transceiver 701 may be configured to receive user data from a data communication network. UE transceiver 702 may be configured to transfer user data to a UE using a number of carrier aggregation carriers and beamforming frequency bands.

Data processing system 703 comprises processing circuitry 704 and storage system 705. Storage system 705 stores software 706. Software 706 includes software modules 707-709. Processing circuitry 704 comprises server blades, backplanes, bus interfaces, integrated circuitry, and associated electronics. Storage system 705 comprises non-transitory, machine-readable, data storage media, such as flash drives, disc drives, memory circuitry, tape drives, servers, and the like. Software 706 comprises machine-readable instructions that control the operation of processing circuitry 704 when executed. Software 706 includes software modules 707-709 and may also include operating systems, applications, data structures, virtual machines, utilities, databases, and the like. All or portions of software 706 may be externally stored on one or more storage media, such as circuitry, discs, tape, and the like.

When executed by processing circuitry 704, carrier aggregation module 707 directs processing circuitry 704 to identify a UE using inter-band carrier aggregation. When executed by processing circuitry 704, carrier aggregation module 707 also directs processing circuitry 704 to identify a UE using intra-band carrier aggregation. When executed by processing circuitry 704, beamforming module 708 directs circuitry 704 to identify a frequency band of the plurality of frequency bands having beamforming capabilities.

When executed by processing circuitry 704, carrier allocation module 709 directs circuitry 704 to allocate the UE using carrier aggregation the PCC on the frequency band having beamforming capabilities. When executed by processing circuitry 704, carrier allocation module 709 also directs circuitry 704 to transfer an indication to the UE indicating the PCC allocation on the frequency band having beamforming capabilities.

The above descriptions and associated figures depict specific embodiments to teach those skilled in the art how to make and use the best mode of the invention. The following claims specify the scope of the invention. Note that some aspects of the best mode may not fall within the scope of the invention as specified by the claims. Those skilled in the art will appreciate variations from these embodiments that fall within the scope of the invention and that the features described above can be combined in various ways to form multiple embodiments. As a result, the invention is not limited to the specific embodiments described above, but only by the claims and their equivalents.

What is claimed is:

1. A method of operating a wireless access point to optimize carrier aggregation using beamforming, the method comprising:
   allocating a carrier aggregation Primary Component Carrier (PCC) and at least one carrier aggregation Secondary Component Carrier (SCC) on a non-beamforming frequency to a UE;
   transferring an indication to the UE indicating the PCC allocation and the SCC allocation on the non-beamforming frequency and wirelessly exchanging additional communication data with the UE using carrier aggregation over the non-beamforming frequency;
   determining that a mobility rate for the UE is above a threshold mobility rate and responsively allocating a carrier aggregation PCC on a beamforming frequency to the UE; and
   transferring an indication to the UE indicating the PCC allocation on the beamforming frequency and wirelessly exchanging additional communication data with the UE using the carrier aggregation PCC on the beamforming frequency and using the at least one carrier aggregation SCC on the non-beamforming frequency.

2. The method of claim 1 wherein the carrier aggregation comprises inter-band carrier aggregation.

3. The method of claim 1 wherein the beamforming frequency comprises a Long Term Evolution (LTE) Transmission Mode 9 (TM9) frequency.

4. The method of claim 1 wherein the beamforming frequency comprises a Long Term Evolution (LTE) Transmission Mode 8 (TM8) frequency.

5. The method of claim 1 wherein the non-beamforming frequency comprises a Long Term Evolution (LTE) Transmission Mode 4 (TM4) frequency.

6. The method of claim 1 wherein the non-beamforming frequency comprises a Long Term Evolution (LTE) Transmission Mode 3 (TM3) frequency.

7. The method of claim 1 wherein the wireless access point comprises a Long Term Evolution (LTE) evolved NodeB (eNodeB).

8. A wireless access point to optimize carrier aggregation using beamforming comprising:
   a data processing system allocating a carrier aggregation Primary Component Carrier (PCC) and at least one carrier aggregation Secondary Component Carrier (SCC) on a non-beamforming frequency to a UE;
   a communication interface configured to transfer an indication to the UE indicating the PCC allocation and the SCC allocation on the non-beamforming on the frequency and wirelessly exchange additional communication data with the UE using carrier aggregation over the non-beamforming frequency;
   the data processing system configured to determine that a mobility rate for the UE is above a threshold mobility rate and responsively allocate a carrier aggregation PCC on a beamforming frequency to the UE; and
   the communication interface configured to transfer an indication to the UE indicating the PCC allocation on the beamforming frequency and wirelessly exchange additional communication data with the UE using the carrier aggregation PCC on the beamforming frequency and using the at least one carrier aggregation SCC on the non-beamforming frequency.

9. The wireless access point of claim 8 wherein the carrier aggregation comprises inter-band carrier aggregation.

10. The wireless access point of claim 8 wherein the beamforming frequency comprises a Long Term Evolution (LTE) Transmission Mode 9 (TM9) frequency.

11. The wireless access point of claim 8 wherein the beamforming frequency comprises a Long Term Evolution (LTE) Transmission Mode 8 (TM8) frequency.

12. The wireless access point of claim 8 wherein the non-beamforming frequency comprises a Long Term Evolution (LTE) Transmission Mode 4 (TM4) frequency.

13. The wireless access point of claim 8 wherein the non-beamforming frequency comprises a Long Term Evolution (LTE) Transmission Mode 3 (TM3) frequency.

14. The wireless access point of claim 8 wherein the wireless access point comprises a Long Term Evolution (LTE) evolved NodeB (eNodeB).

\* \* \* \* \*